United States Patent
Chang et al.

(10) Patent No.: US 8,144,823 B2
(45) Date of Patent: Mar. 27, 2012

(54) SIGNAL PROCESSING DEVICE AND SIGNAL PROCESSING METHOD

(75) Inventors: Yun-Shen Chang, Jhubei (TW); Jiunn-Tsair Chen, HsinChu (TW)

(73) Assignee: Ralink Technology Corporation, Hsinchu (TW)

( * ) Notice: Subject to any disclaimer, the term of this patent is extended or adjusted under 35 U.S.C. 154(b) by 592 days.

(21) Appl. No.: 12/361,043

(22) Filed: Jan. 28, 2009

(65) Prior Publication Data

US 2009/0238315 A1    Sep. 24, 2009

(30) Foreign Application Priority Data

Mar. 21, 2008   (TW) .............................. 97109997 A

(51) Int. Cl.
*H03D 1/04*    (2006.01)

(52) U.S. Cl. ........ 375/346; 375/148; 375/144; 375/340; 375/130; 455/561; 455/296; 370/203; 370/320; 370/487; 370/488

(58) Field of Classification Search .................. 375/346, 375/148, 144, 340, 130; 455/561, 296; 370/203, 370/320, 487, 488
See application file for complete search history.

(56) References Cited

U.S. PATENT DOCUMENTS

| 6,115,409 | A | * | 9/2000 | Upadhyay et al. | 375/144 |
| 6,157,685 | A | * | 12/2000 | Tanaka et al. | 375/346 |
| 6,157,847 | A | * | 12/2000 | Buehrer et al. | 455/561 |
| 6,324,159 | B1 | * | 11/2001 | Mennekens et al. | 370/203 |
| 6,711,219 | B2 | * | 3/2004 | Thomas et al. | 375/346 |
| 7,099,377 | B2 | * | 8/2006 | Berens et al. | 375/130 |
| 7,254,192 | B2 | * | 8/2007 | Onggosanusi et al. | 375/340 |
| 7,586,981 | B2 | * | 9/2009 | Chae et al. | 375/148 |
| 2006/0159188 | A1 | | 7/2006 | Izumi | |
| 2010/0232553 | A1 | * | 9/2010 | Gomadam et al. | 375/346 |

FOREIGN PATENT DOCUMENTS

TW    I260135    8/2006

\* cited by examiner

*Primary Examiner* — Eva Puente
(74) *Attorney, Agent, or Firm* — Winston Hsu; Scott Margo

(57) ABSTRACT

The present invention discloses a signal processing device and a signal processing method. The signal processing device includes a plurality of receiving devices, a storage module, a weighting module, and a processing module. Each of the receiving devices is capable of receiving an original signal stream, thus the plurality of receiving devices can generate a set of signal streams. The storage module is used for storing a plurality set of signal streams generated by the plurality of receiving devices. The weighting module can generate plurality sets of rotated signal streams according to a reference phase and the plurality sets of signal streams, and further generate a set of weighting signal according to the rotated signal streams. And, the processing module can generate a set of weighting signal streams according to the set of weighting signal and the plurality set of signal streams.

7 Claims, 3 Drawing Sheets

SIGNAL PROCESSING DEVICE AND SIGNAL PROCESSING METHOD

BACKGROUND OF THE INVENTION

1. Field of the Invention

This invention relates to a signal processing device and a signal processing method and, more particularly, to a signal processing device and a signal processing method which are capable of performing mathematical calculations on a plurality of the signal streams received by a plurality of receiving devices, so as to obtain an additional SNR gain.

2. Description of the Prior Art

Due to weeding out the old and bringing forth the new in various kinds of wireless products, such as cell phones, wireless LANs, GPSs, etc., the requirements of consumers toward these products are turning to low price, diminished size, high performance, etc. However, these requirements make the designs of the wireless products more and more difficult. Take a 2.4 GHz wireless LAN network interface card (802.11n) as an instance, it requires more than two antennas. It is thus a challenge for antenna engineers to arrange two 2.4 GHz antennas in a small region of the wireless LAN network interface card with USB interface.

Recently, with the advancement of computers & network technologies and various kinds of newly developed wireless products such as cell phones, wireless LANs, GPSs, etc., users are used to save and retrieve files among different wireless products. The arising of wireless communication accelerates to establish wireless networks among individual personals, enterprises, and communities.

In general, the wireless network equipment of personal computers includes a computer and a modem which complies with EEE 802.11a/802.11g. An antenna is disposed in or next to the computer, and a RF chip is used for receiving signals via the antenna. An ADC (analog-to-digital convert) is used for converting the received signals to baseband signals. Then, a baseband processing device is used to decode the baseband signals into data. The data may be the files transmitted by another computer of a remote user through wireless network and a transmitter.

There have been many devices and methods which realize the receivers of 802.11a/g modems. However, those prior arts do not fully elaborate the efficiency of the 802.11a/g modems. For example, the maximum transmission rate of the modems is 54 Mbits/sec, but the prior arts usually can not reach the maximum transmission rate owing to the effects of multi-path channels. Actually, it usually succeeds to receive the data only at lower transmission rate under multi-path channel conditions.

In order to improve the receiving performance of high speed wireless transmission, some receivers may adopt multiple antennas. While designing a MIMO (Multiple Input Multiple Output) transceiver, it usually is a challenge to combine the multiple channels. The traditional 802.11g receivers decode both time domain and frequency domain at the same time. That is to say, the traditional 802.11g receivers adopt the CCK (Complementary Code Keying) and OFDM (Orthogonal Frequency Division Multiplexing) at the same time.

In general, the operations such as packet detection and parameter extraction before the data detection can be used for performing the subsequent packet detection and carrier frequency offset acquisition. A conventional way is to adopt the maximum antenna method in which the antenna is used to receive signals with the maximum power. Another conventional way is to simply sum up the received signals of all the antennas.

However, with regard to the former way, not only the intensity of the received signals is limited, but also the advantages of the multiple antennas can not be fully utilized. With regard to the latter way, the antenna may form beams toward the null direction of the incident wave, so as to derive a result just acceptable.

Accordingly, the major object of the inventor is to provide a signal processing device and a signal processing method for performing mathematical calculations on the plurality of the signal streams received by the plurality of receiving devices, so as to obtain an additional SNR gain. Hereby, the processes such as the packet detection, the carrier frequency offset acquisition, etc., can be improved.

SUMMARY OF THE INVENTION

According to a preferred embodiment of the present invention, a signal processing device is disclosed. The signal processing device includes a plurality of receiving devices, a storage module, a weighting module, and a processing module. Each receiving device is used for receiving an original signal stream so that the plurality of the receiving devices generate a set of signal streams, and each of the signal streams corresponds to one phase. The storage module is coupled to the plurality of receiving devices. The storage module is used for storing plurality sets of signal streams generated by the plurality of receiving devices at a plurality of times. The weighting module is coupled to the storage module. The weighting module is used for selecting a reference signal stream according to the set of signal streams to which each time corresponds, and the reference signal stream corresponds to a reference phase. The weighting module generates a set of rotated signal streams to which each time corresponds according to the reference phase and the set of signal streams. Besides, the weighting module also generates a set of weighting signals according to the plurality sets of rotated signal streams of the plurality of times. The processing module is used for generating a set of weighting signal streams according to the set of weighting streams and the plurality sets of signal streams.

Moreover, another preferred embodiment of the present invention discloses a signal processing method. Firstly, the signal processing method performs the step of receiving an original signal stream to generate a set of signal streams, wherein each signal stream corresponds to one phase. Next, the signal processing method performs the step of storing a plurality of signal streams generated at a plurality of times. Then, the signal processing method performs the step of selecting a reference signal stream according to the set of signal streams to which each time corresponds, wherein the reference signal stream corresponds to a reference phase. After that, the signal processing method performs the step of generating a set of rotated signal streams to which each time corresponds according to the reference phase and a set of signal streams. Afterward, the signal processing method performs the step of generating a set of weighting signals according to the plurality sets of rotated signal steams of the plurality of times. Finally, the signal processing method performs the step of generating a set of weighting signal streams according to the set of weighting signals and the plurality sets of signal streams.

Accordingly, the signal processing device and the signal processing method according to the present invention are used for performing mathematical calculations on the plurality of the signal streams received by the plurality of receiving devices, so as to obtain an additional SNR gain. Hereby, the processes such as the packet detection, the carrier frequency offset acquisition, etc., can be improved.

With the example and explanations above, the features and spirits of the present invention will be hopefully well described. Those skilled in the art will readily observe that numerous modifications and alterations of the device may be made while retaining the teaching of the present invention. Accordingly, the above disclosure should be construed as limited only by the metes and bounds of the appended claims.

BRIEF DESCRIPTION OF THE APPENDED DRAWINGS

DETAILED DESCRIPTION OF THE INVENTION

An object of the invention is to provide a signal processing device and a signal processing method. Particularly, the signal processing device and the signal processing method of the present invention are used for performing mathematical calculations on the plurality of the signal streams received by the plurality of receiving devices, so as to obtain an additional SNR gain. Hereby, the processes such as the packet detection, the carrier frequency offset acquisition, etc., can be improved. With the embodiment of the invention below, the features and spirits of the invention will be hopefully well described.

Figure 1:
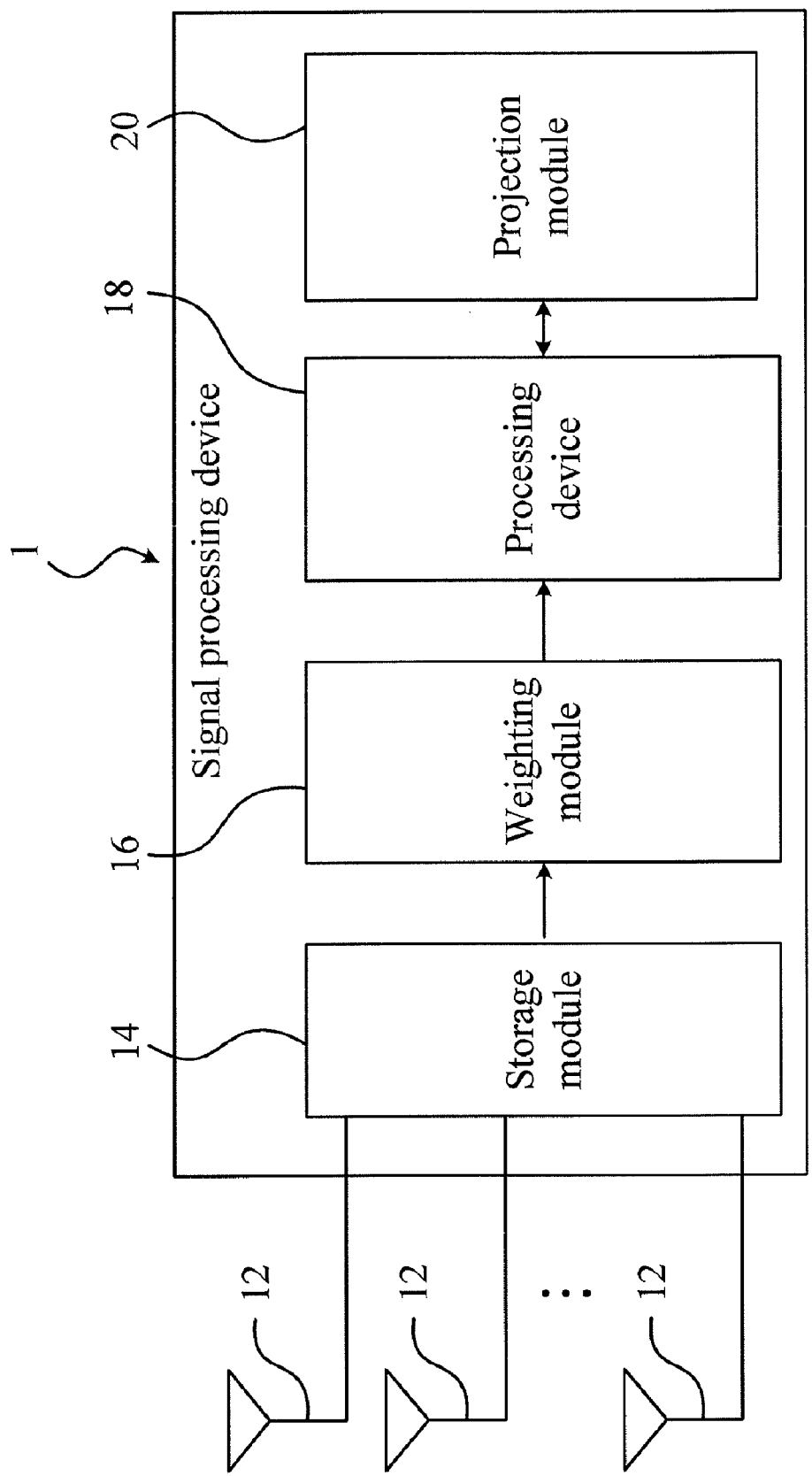
FIG. 1 is a schematic diagram illustrating a signal processing device according to an embodiment of the present invention.

Please refer to FIG. 1 which is a schematic diagram illustrating a signal processing device 1 according to an embodiment of the present invention. As shown in FIG. 1, the signal processing 1 device includes a plurality of receiving devices 12, a storage module 14, a weighting module 16, and a processing module 18.

As shown in FIG. 1, the plurality of receiving devices 12 are capable of generating a set of signal streams by receiving an original signal stream with each receiving device 12. Each of the signal streams corresponds to one phase.

In an embodiment, assuming that the signal processing device 1 according to the present invention has N receiving devices 12, the set of signal streams can be a signal stream vector (y) stated as follows:

$$y = [y_1 \; y_2 \; \Lambda \; y_N]^T;$$

where y represents the signal stream vector, $y_1$ to $y_N$ respectively represents the N signal streams received by the N receiving devices 12, and $[\bullet]^T$ represents a transpose.

As shown in FIG. 1, the storage module 14 is coupled to the plurality of the receiving devices 12. The storage module 14 is capable of storing the plurality sets of signal streams generated by the plurality of receiving devices 12 at a plurality of times.

As shown in FIG. 1, the weighting module 16 is coupled to the storage module 14. The weighting module 16 is capable of selecting a reference signal stream according to the set of signal streams to which each time corresponds. The reference signal stream corresponds to a reference phase. The weighting module 16 is capable of generating a set of rotated signal streams to which each time corresponds according to the reference phase and the set of signal streams.

In the embodiment, the weighting module 16 is capable of inducing a rotated signal stream vector ($y_{rot}$) of the set of rotated signal streams by the following equation:

$$y_{rot} = \frac{y}{e^{j\phi_m}} = [y_1' \; y_2' \; \Lambda \; y_N']^T;$$

where $y_{rot}$ represents the rotated signal stream vector, $\phi_m$ represents the reference phase to which the reference signal stream corresponds, and $y_1'$ to $y_N'$ respectively represents N rotated signal streams to which the N signal streams correspond.

As shown in FIG. 1, the weighting module 16 is capable of generating a set of weighting signals according to the plurality sets of rotated signal streams of the plurality of times.

In the embodiment, assuming that the storage module 14 is capable of storing S sets of signal streams generated by the N receiving devices 12 at S times, the weighting module 16 can calculate a weighting vector of the N weighting signals by the following equation:

$$w = \frac{\sum_{i=1}^{S} y_{rot,i}}{S};$$

where w represents the weighting vector, and S represents the number of the different times.

As shown in FIG. 1. The processing module 18 generates a set of weighting signal streams according to the set of weighting signals and the plurality set of signal streams.

In the embodiment, the set of weighting signal streams ($y_{Combined}$) can be represented as following:

$$y_{Combined} = w^H y;$$

where $y_{Combined}$ represents the set of weighting signal streams, and $[\bullet]^H$ represents an hermitian transpose.

Especially, an additional SNR gain can be obtained from the original signal stream by obtaining the weighting signal streams, so as to improve subsequent processes such as packet detection, carrier frequency offset acquisition, and etc.

In additional, in order to efficiently utilize the original signal stream, in an embodiment, the signal processing devices 1 according to the present invention can further comprise a projection module 20. The projection module 20 is used for generating a set of projection signal streams respectively according to a set of signal streams to which each time corresponds and the set of weighting signal streams, as shown in FIG. 1.

Figure 2:
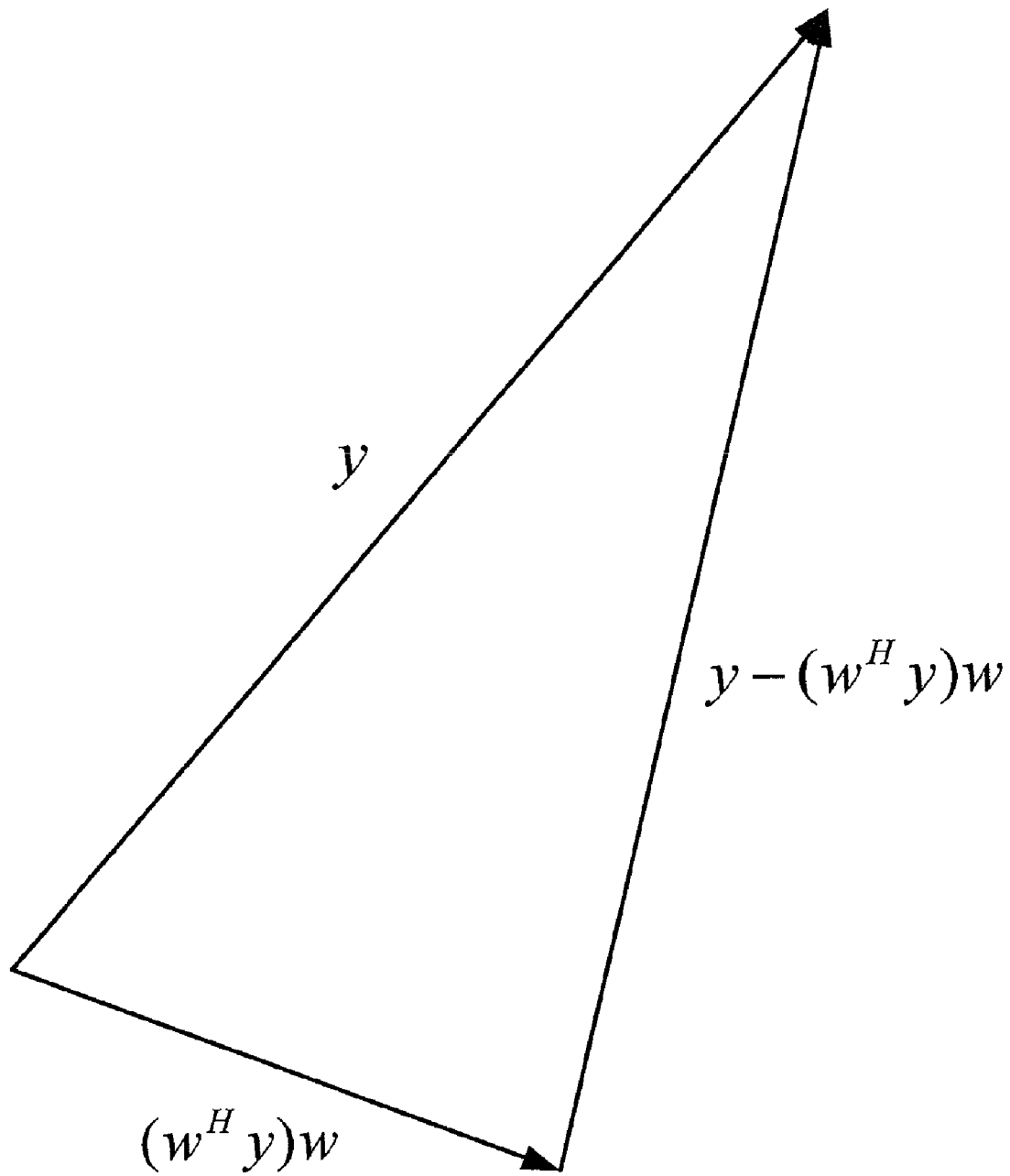
FIG. 2 is a schematic diagram illustrating a set of residual signal streams which is generated by a set of signal streams and a set of corresponding projection signal streams according to an embodiment of the present invention.

As shown in FIG. 1, in the embodiment, the processing module 18 is capable of further generating a set of residual signal streams respectively according to a set of signal streams to which each time corresponds and a set of projection signal streams to which each time corresponds. Please refer to FIG. 2 which is a schematic diagram illustrating a set of residual signal streams generated by a set of signal streams and a set of corresponding projection signal streams according to an embodiment of the present invention.

In the embodiment, the set of projection signal streams can be represented as ($w^H y)w$. And a residual signal stream vector ($y_{residual}$) of the set of residual signal streams can be represented as following:

$$y_{residual} = y - (w^H y)w;$$

where $y_{residual}$ represents the residual signal stream victor. Thus, the signal processing device 1 of the present invention can be repeated to perform a signal mathematical calculation processing on the set of residual signal streams (i.e. the unused part of the signal streams) to obtain an additional SNR gain, so as to efficiently utilize the received signal streams.

According to an embodiment, each receiving devices 12 is an antenna. In other words, the plurality of receiving device 12 can be a multiple antenna.

Figure 3:
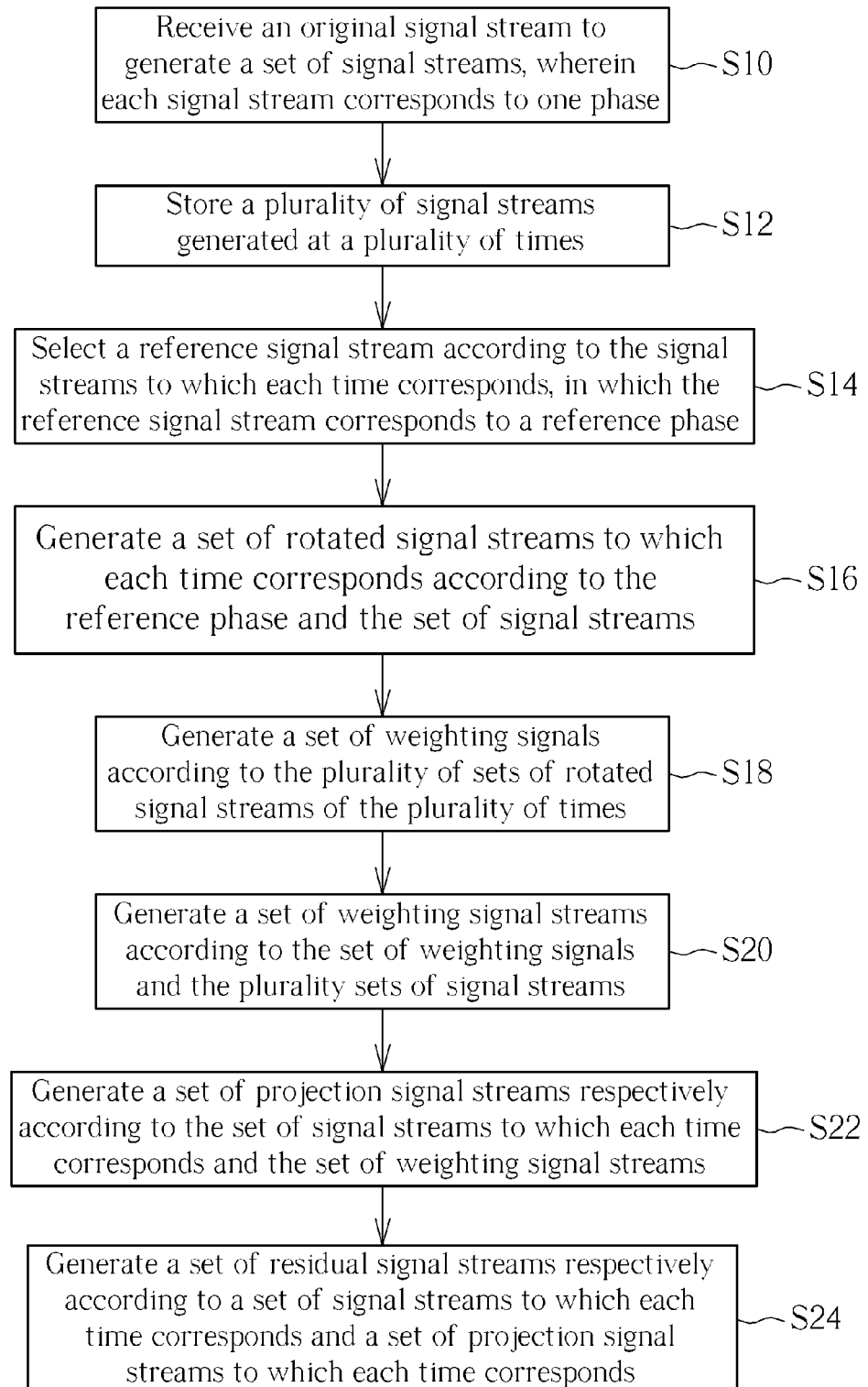
FIG. 3 is a flow chart diagram illustrating the signal processing method according to an embodiment of the present invention.

Please refer to FIG. 3 which is a flow chart diagram illustrating the signal processing method according to an embodiment of the present invention. The signal processing method is applied to the signal processing device 1 in FIG. 1 and includes the following steps.

Firstly, step S10 is performed to receive an original signal stream to generate a set of signal streams, wherein each signal stream corresponds to one phase. Next, step S12 is performed to storage a plurality of the signal streams generated at a plurality of times. Then, step S14 is performed to select a reference signal stream according to the signal streams to which each time corresponds, in which the reference signal stream corresponds to a reference phase. After that, step S16 is performed to generate a set of rotated signal streams to which each time corresponds according to the reference phase and the set of signal streams. Afterwards, step S18 is performed to generating a set of weighting signals according to the plurality sets of rotated signal streams of the plurality of times. Finally, step S20 is performed to generate a set of weighting signal streams according to the set of weighting signals and the plurality set of signal streams.

Besides, in order to efficiently utilize the original signal stream, in an embodiment, the signal processing method according to the present invention further comprises the following steps. Then, step S22 is performed to generate a set of projection signal streams respectively according to the set of signal streams to which each time corresponds and the set of weighting signal streams. Subsequently, step S24 is performed to generate a set of residual signal streams respectively according to a set of signal streams to which each time corresponds and a set of projection signal streams to which each time corresponds.

Thus, the present invention is capable of repeatedly performing a signal mathematical calculation processing on the set of residual signal streams (i.e. the unused part of the signal streams), so as to efficiently utilize the received signal streams.

Compare with prior arts, the signal processing device and signal processing method of the present invention are used for performing mathematical calculations on the plurality of the signal streams received by the plurality of receiving devices, so as to obtain an additional SNR gain. Thus, the signal processing steps (e.g., packet detection, carrier frequency offset acquisition, etc.) can be improved. Besides, the signal processing device and signal processing method according to the present invention not only completely utilize the data provided by multiple antennas, but also make the convergent rate fast. Therefore, the necessary processing period before the operation of data detection will be massively decreased.

With the example and explanations above, the features and spirits of the present invention will be hopefully well described. Those skilled in the art will readily observe that numerous modifications and alterations of the device may be made while retaining the teaching of the present invention. Accordingly, the above disclosure should be construed as limited only by the metes and bounds of the appended claims.

What is claimed is:

1. A signal processing device, comprising:
   a plurality of receiving devices for receiving an original signal stream to generate a set of signal streams, wherein each of the set of signal streams corresponds to a phase;
   a storage module, coupled to the plurality of receiving devices, for storing a plurality sets of signal streams generated by the plurality of receiving devices at a plurality of times;
   a weighting module, coupled to the storage module, for selecting a reference signal stream according to the set of signal streams to which each time corresponds, the reference signal stream corresponding to a reference phase, the weighting module generating a set of rotated signal streams to which each time corresponds according to the reference phase and the set of signal streams, and generating a set of weighting signals according to the plurality sets of rotated signal streams of the plurality of times; and
   a processing module for generating a set of weighting signal streams according to the set of weighting signals and the plurality sets of signal streams.

2. The signal processing device of claim 1, wherein the plurality of receiving devices is an antenna.

3. The signal processing device of claim 1, further comprising a projection module which generates a set of projection signal streams according to a set of signal streams to which each time corresponds and the set of weighting signal streams, respectively.

4. The signal processing device of claim 1, wherein the processing module respectively generates a set of residual signal streams according to a set of signal streams to which each time corresponds and a set of projection signal streams to which each time corresponds.

5. A signal processing method, comprising the steps of:
   receiving an original signal stream to generate a set of signal streams, wherein each of the set of signal streams corresponds to a phase;
   storing a plurality sets of signal streams generated at a plurality of times;
   selecting a reference signal stream according to the signal stream to which each time corresponds, the reference signal stream corresponding to a reference phase;
   generating a set of rotated signal streams according to the reference phase and the set of signal stream to which each time corresponds;
   generating a set of weighting signals according to a plurality sets of rotated signal streams at the plurality of times; and
   generating a set of weighting signal streams according to the set of weighting signals and the plurality sets of signal streams.

6. The signal processing method of claim 5, further comprising a step of generating a set of projection signal streams respectively according to the set of signal streams to which each time corresponds and the set of weighting signal streams.

7. The signal processing method of claim 6, further comprising a step of generating a set of residual signal streams respectively according to a set of signal streams to which each time corresponds and a set of projection signal streams to which each time corresponds.

* * * * *